Figure 1:
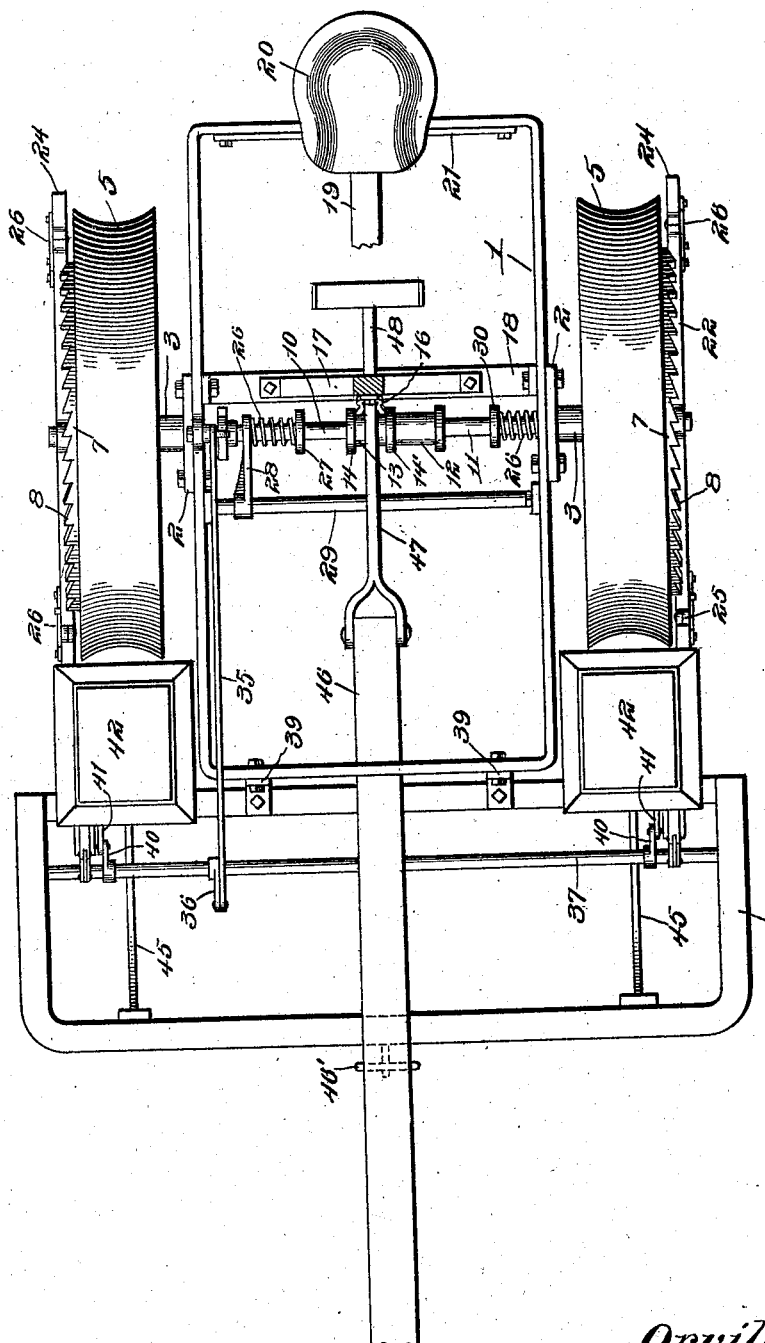

No. 815,554. PATENTED MAR. 20, 1906.
O. PHILLIPS.
PLANTER.
APPLICATION FILED OCT. 26, 1905.

2 SHEETS—SHEET 1.

Witnesses
Louis R. Heinrichs
Herbert D. Lawson

Inventor
Orville Phillips
By W. J. FitzGerald & Co.
Attorneys

No. 815,554. PATENTED MAR. 20, 1906.
O. PHILLIPS.
PLANTER.
APPLICATION FILED OCT. 26, 1905.
2 SHEETS—SHEET 2.
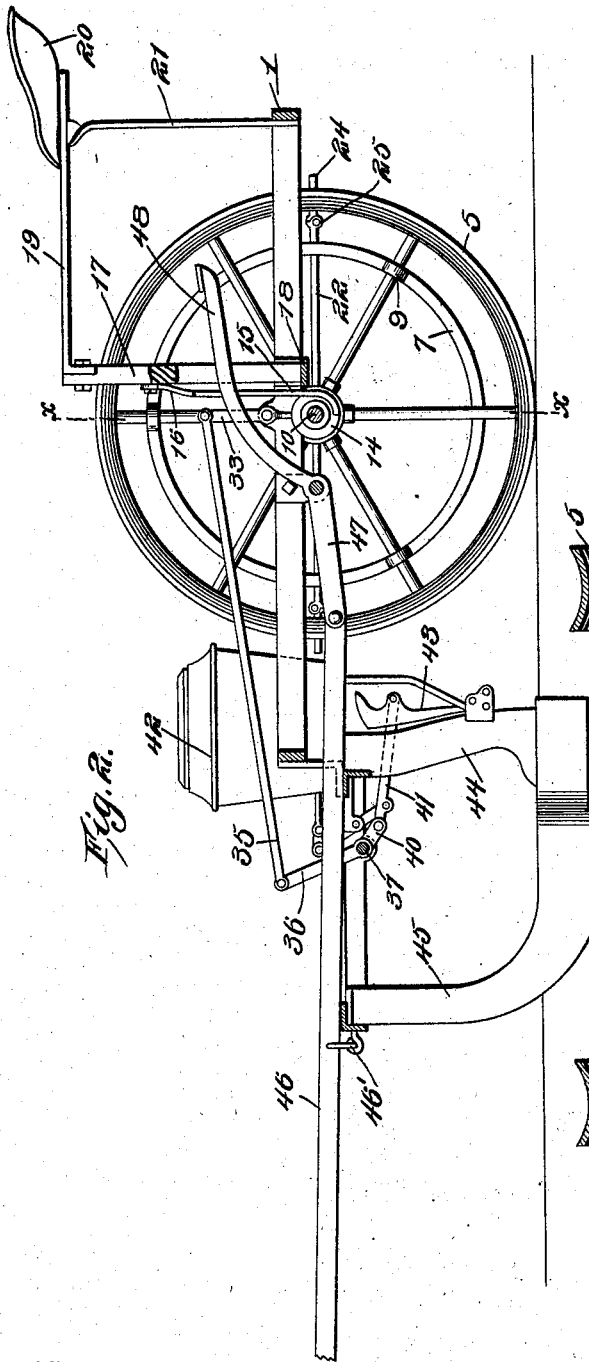
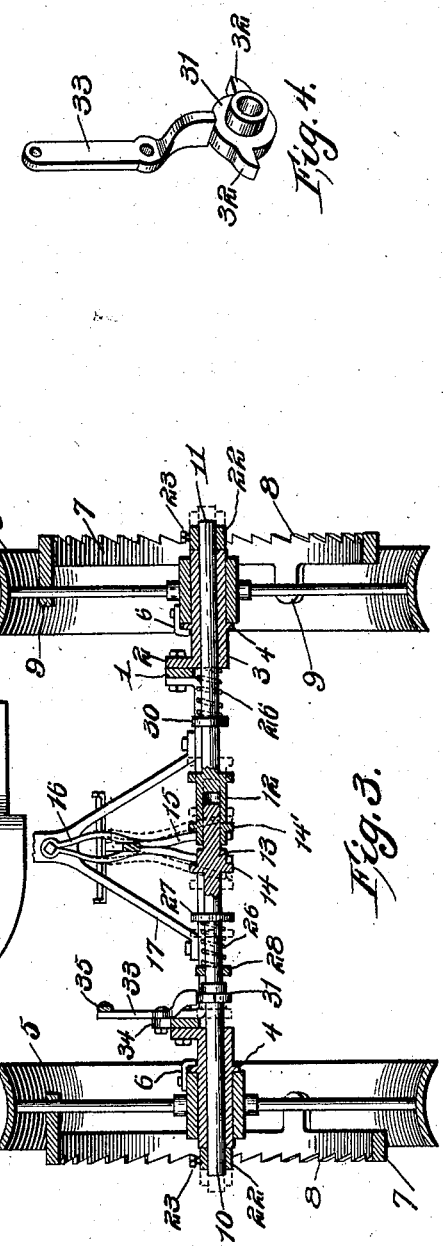
Witnesses
Louis R. Heinrichs
Herbert D. Lawson
Inventor
Orville Phillips
By W. T. FitzGerald
Attorneys

UNITED STATES PATENT OFFICE.

ORVILLE PHILLIPS, OF BRAYMER, MISSOURI.

PLANTER.

No. 815,554.  Specification of Letters Patent.  Patented March 20, 1906.

Application filed October 26, 1905. Serial No. 284,523.

*To all whom it may concern:*

Be it known that I, ORVILLE PHILLIPS, a citizen of the United States, residing at Braymer, in the county of Caldwell and State of Missouri, have invented certain new and useful Improvements in Planters; and I do hereby declare the following to be a full, clear, and exact description of the invention, such as will enable others skilled in the art to which it appertains to make and use the same.

My invention relates to check-row planters; and its object is to provide a compact machine of this character having a row-checking device of novel form adapted to be readily placed into or out of operative relation with the wheels of the planter and which can be easily set to any position desired.

A still further object is to provide mechanism under the constant control of the operator for throwing the checking device into or out of operative position and at the same time similarly effecting the operation of the seed-dropping mechanism.

With the above and other objects in view the invention consists of certain novel features of construction and combination of parts, which will be hereinafter fully described, and pointed out in the claims.

In the accompanying drawings I have shown the preferred form of my invention.

In said drawings, Figure 1 is a plan view of my improved planter, a portion of the seat-support being removed. Fig. 2 is a central longitudinal section through the planter. Fig. 3 is a section on line x x, Fig. 2; and Fig. 4 is a detail view of the cam and lever for actuating the seed-dropping mechanism.

Referring to the figures by numerals of reference, 1 is a preferably rectangular frame having plates 2 bolted to the sides thereof, and from these plates extend sleeves 3. Each of these sleeves has a collar 4, and upon the sleeves are mounted traction-wheels 5, which are held against displacement by means of angular retaining-plates 6, which are fastened to the hubs of the wheels and overlap the collars, as shown in Fig. 3. Secured to the outer portion of each of the traction-wheels is a ring 7, having ratchet-teeth 8 on its outer edge, and this ring is preferably connected to the spokes of its wheel by means of ears 9, through which certain of the spokes extend. Alining shafts or axles 10 and 11 are slidably mounted within and extend through the two sleeves, and the inner end of shaft 10 projects into and is adapted to slide within an enlarged tubular head 12, which is formed at the inner end of shaft 11. Shaft 10 also has a head 13 adjacent its inner end, which is adapted to limit the movement of the two shafts toward each other by contacting with the end of head 12, and the two heads 12 and 13 have collars 14 and 14', between which are disposed curved arms 15, which are preferably integral, and constitute springs 16 at their upper ends. The two spring-arms 15 are so shaped as to contact at points between their ends and leave spaces above and below the point of contact. The upper end of the spring-arms 15 is secured to a forked standard 17, mounted on a cross-bar 18, secured within the frame, and this standard has a rearward extension 19, on which is mounted the driver's seat 20, a supporting-strip 21 also connecting the extension 19 with the frame 1.

Secured to the outer ends of shafts 10 and 11 are checking-arms 22, said arms being fastened at their centers to the shafts, preferably by means of set-screws 23. The ends of the arms have fingers 24 connected to them, preferably by means of knuckle-joints 25, and springs 26 serve to hold the fingers normally in alinement with arms 22. The arms 22 are held in engagement with the toothed rings 7 by means of coiled springs 26, which are mounted on the shafts 10 and 11. One of these springs bears against a collar 27 on shaft 10 and an arm 28, which extends from a cross-rod 29, secured within the frame 1. The other spring 26 bears at opposite ends upon one side of frame 1 and upon a collar 30, secured to the shaft 11. It will therefore be seen that these two springs serve to press the two shafts together and to hold the checking-arms in engagement with the toothed rings.

A cam 31, having tripping-fingers 32, is secured to shaft 10 between the side of frame 1 and the arm 28. This cam is adapted to trip a lever 33, fulcrumed upon a small standard 34, secured to one side of frame 1, and a rod 35 connects this lever 33 with an arm 36, which extends from a rocking shaft 37, which is mounted within a front frame 38, connected to the frame 1, preferably by means of brackets 39. This shaft 37 when rocked is adapted, by means of arms 40 and links 41, to operate the seed-dropping mechanism (not shown) within the seedboxes 42 and the valve 43 in the seed-tube 44, which is mounted in rear of runners or furrow-openers 45 in the usual manner. These runners, as well as the seed tubes and boxes, are rigidly connected to the front frame 38. A tongue 46 is connected to the front frame 38 in any suitable manner, as by means of a link 46'. Pivoted to the rear end of this tongue is a lever 47, which is fulcrumed upon the rod 29, above referred to, and has a treadle 48 extending rearwardly therefrom and between the springs 16 above the point of contact between arms 15.

In using the machine herein described the checking-arms can first be set by loosening the set-screws 23. After they have been refastened on the shafts 10 and 11 the machine is pulled forward, so that the fingers 24 will mark the ground and the cam 31 will rotate, so as to cause its fingers 32 to trip lever 33. This tripping action will cause the shaft 37 to rock and actuate the dropping mechanism of the machine. Should it for any reason be desirable to stop the operation of the dropping mechanism and the marker, the driver presses downward on treadle 48. This will cause said treadle to wedge between the contacting portions of arms 15, and said arms will therefore be spread apart, as shown by dotted lines in Fig. 3, and move the shafts 10 and 11 away from each other and compress the springs 26. The marking-arms 23 will therefore be disengaged from the teeth on rings 7, and the wheels 5 can rotate without causing the rotation of said arms and shafts 10 and 11, and therefore the cam 31 will also remain inactive. The depression of treadle 48 also serves to lift up the rear end of tongue 46, and as the forward end of said tongue is supported by draft-animals it will be seen that the forward portion of the frame will be raised by this action, so as to lift the runners out of the ground. The weight of the frame when released will be sufficient to return the treadle 48 to its initial position. Should the rotating marking-arms come in contact with stones or other resisting objects, the fingers 24 will swing backward, so that the arms will not be broken, and as soon as these fingers pass over said object their springs 26 will return them to normal position.

Having thus fully described my invention, what I claim as new, and desire to secure by Letters Patent, is—

1. In a planter, the combination with a frame, laterally-extending sleeves secured to the frame, and wheels rotatably mounted upon said sleeves; of alining, telescoping shafts slidably mounted within the sleeves, a marking-arm secured to each shaft, a toothed ring secured to and rotatable with each of the wheels, resilient means upon the shafts for holding the marking-arms normally in engagement with the toothed rings, and mechanism for simultaneously moving the shafts and the marking-arms in opposite directions.

2. In a planter the combination with a frame and wheels supporting the same; of toothed rings secured to said wheels, alining shafts slidably mounted within the frame and wheels and telescoped at their adjoining ends, marking-arms secured to the shafts, means on said shafts for holding the arms normally in engagement with the rings, arms engaging the shafts and adapted to slide them in opposite directions, and a treadle interposed between and adapted to spread apart said arms to simultaneously actuate the shafts.

3. In a planter the combination with a frame and wheels supporting the same; of toothed rings secured to said wheels, alining shafts slidably mounted within the frame and wheels and telescoped at their adjoining ends, marking-arms secured to the shafts, means on said shafts for holding the arms normally in engagement with the rings, arms engaging the shafts and adapted to slide them in opposite directions, a treadle interposed between and adapted to spread apart said arms to simultaneously actuate the shafts, and dropping mechanism actuated by the rotation of the arms.

4. In a planter the combination with a frame and wheels supporting the same; of toothed rings secured to said wheels, alining shafts slidably mounted within the frame and wheels and telescoped at their adjoining ends, marking-arms secured to the shafts, means on said shafts for holding the arms normally in engagement with the rings, arms engaging the shafts and adapted to slide them in opposite directions, a treadle interposed between and adapted to spread apart said arms to simultaneously actuate the shafts, dropping mechanism actuated by the rotation of the arms, and means operated by the treadle for raising the dropping mechanism simultaneously with the sliding of the shafts.

In testimony whereof I have signed my name to this specification in the presence of two subscribing witnesses.

ORVILLE PHILLIPS.

Witnesses:
GLENN KEPLEY,
GUY LESLIE.